(12) United States Patent
Vinas et al.

(10) Patent No.: US 9,850,364 B2
(45) Date of Patent: Dec. 26, 2017

(54) PROCESS FOR THE PREPARATION OF A VINYLIDENE CHLORIDE POLYMER COMPOSITE

(71) Applicants: SOLVAY SA, Brussels (BE); CENTRE NATIONAL DE LA RECHERCHE SCIENTIFIQUE, Paris (FR); ECOLE NATIONALE SUPERIEURE DE CHIMIE DE MONTPELLIER, Montpellier (FR); UNIVERSITE DE MONTPELLIER 2, Montpellier (FR)

(72) Inventors: Jérôme Vinas, Brussels (BE); Pierre-Emmanuel Dufils, Tavaux (FR); Jérôme Garnier, Lescar (FR); Patrick Lacroix-Desmazes, Montpellier (FR); Alex Van Herk, Singapore (SG); Jérôme Warnant, Saint-Apollinaire (FR); Yves Vanderveken, Heverlee (BE)

(73) Assignees: Solvay SA, Brussels (BE); Centre National De La Recherche Scientifique, Paris (FR); Ecole Nationale Superieure De Chimie De Montpellier, Montpellier (FR); Universite De Montpellier 2, Montepellier (FR)

( * ) Notice: Subject to any disclaimer, the term of this patent is extended or adjusted under 35 U.S.C. 154(b) by 175 days.

(21) Appl. No.: 14/366,986

(22) PCT Filed: Dec. 18, 2012

(86) PCT No.: PCT/EP2012/075951
§ 371 (c)(1),
(2) Date: Jun. 19, 2014

(87) PCT Pub. No.: WO2013/092588
PCT Pub. Date: Jun. 27, 2013

(65) Prior Publication Data
US 2014/0371370 A1    Dec. 18, 2014

(30) Foreign Application Priority Data

Dec. 21, 2011 (EP) .................................. 11306729
Feb. 7, 2012 (EP) .................................. 12305133
Sep. 21, 2012 (EP) .................................. 12306139

(51) Int. Cl.
C08K 3/22 (2006.01)
B05D 7/00 (2006.01)
C08F 114/08 (2006.01)
C08J 5/18 (2006.01)

(52) U.S. Cl.
CPC ................ *C08K 3/22* (2013.01); *B05D 7/00* (2013.01); *C08F 114/08* (2013.01); *C08J 5/18* (2013.01); *C08J 2327/08* (2013.01); *C08K 2003/2213* (2013.01); *Y10T 428/2998* (2015.01)

(58) Field of Classification Search
CPC .... C08K 3/22; C08K 2003/2213; B05D 7/00; C08J 5/18; C08J 2327/08; C08F 114/08
USPC ......................................................... 524/430
See application file for complete search history.

(56) References Cited

U.S. PATENT DOCUMENTS

| 7,230,063 B1 | 6/2007 | Parker | |
|---|---|---|---|
| 2006/0222797 A1* | 10/2006 | Bekele | B65D 75/327 428/35.7 |
| 2011/0054074 A1* | 3/2011 | Jonschker | C08F 283/12 523/400 |

FOREIGN PATENT DOCUMENTS

| CA | 899723 A * | 5/1972 | ............... C08F 2/44 |
|---|---|---|---|
| EP | 1801158 A1 | 6/2007 | |
| JP | 2006512459 A | 4/2006 | |
| JP | 2010265339 A | 11/2010 | |
| JP | 2011037957 A | 2/2011 | |
| JP | 2011137082 A | 7/2011 | |
| WO | 9801478 A1 | 1/1998 | |
| WO | 9858974 A1 | 12/1998 | |
| WO | 02090397 A1 | 11/2002 | |
| WO | 2004/060928 A1 | 7/2004 | |
| WO | 2005028557 A1 | 3/2005 | |
| WO | 2006037161 A1 | 4/2006 | |
| WO | 2009130233 A1 | 10/2009 | |

(Continued)

OTHER PUBLICATIONS

Severac et al., "Vinylidene Chloride Copolymerization with Methyl Acrylate by Reversible Addition-Fragmentation Chain Transfer (RAFT) Process," Polymer Preprints, American Chemical Society, Division of Polymer Chemistry, vol. 43, No. 2, pp. 124-125 (2002).*

(Continued)

*Primary Examiner* — Ling Choi
*Assistant Examiner* — Ronald Grinsted

(57) ABSTRACT

Process for the preparation of a vinylidene chloride polymer composite comprising a solid particulate encapsulated in the vinylidene chloride polymer. The process comprises providing a dispersion of a solid particulate material in a liquid phase, said dispersion comprising a RAFT/MADIX agent; providing vinylidene chloride and optionally one or more ethylenically unsaturated monomer copolymerizable therewith to said dispersion; and polymerizing vinylidene chloride and said optionally present one or more ethylenically unsaturated monomer under the control of said RAFT/MADIX agent to form polymer at the surface of said solid particulate material.

10 Claims, 1 Drawing Sheet

(56) References Cited

FOREIGN PATENT DOCUMENTS

WO     WO 2009129923 A1 * 10/2009 ............ C08F 283/12

OTHER PUBLICATIONS

Vandendael Y., "Poly(vinylidene chloride", Ullmann's Encyclopedia of Industrial Chemistry, 2005, Wiley VCH-Verlag (published on-line Jun. 15, 2000).

Perrier S. et al, "Macromolecular design via Reversible Addition-Fragmentation Chain Transfer (RAFT)/Xanthates (MADIX) polymerization", Journal of Polymer Science: Part A: Polymer Chemistry, 2005, vol. 43, pp. 5347-5393—Wiley Periodicals.

Beija M. et al., "RAFT/MADIX polymers for the preparation of polymer inorganic nanohybrids", Progess in Polymer Science, Jan. 22, 2011, vol. 36, pp. 845-886, XP002670059—Elsevier Ltd.

Favier A. et al., "Experimental requirement for an efficient control of free-radical polymerizations via the reversible addition-fragmentation chain transfer (RAFT) process", Macromol. Rapid. Commun., 2006, vol. 27, p. 653-692—Wiley-VCH Verlag GmbH & Co. KGaA, Weinheim.

Ali S.I. et al., "Polymer Encapsulated Gibbsite Nanoparticles: Efficient Preparation of Anisotropic Composite Latex Particles by RAFT-Based Starved Feed Emulsion Polymerization", LANGMUIR, 2009, vol. 25, No. 18, pp. 10523-10533—American Chemical Society.

Ribaut T. et al., "Synthesis of gradient copolymers with complexing groups by RAFT polymerization and their solubility in supercritical $CO_2$", J. Polym. Sci., Part A: Polym. Chem., 2009, vol. 47, issue 20, pp. 5448-5460—Wiley Periodicals Revillon A. et al., "Molecular weight determination of vinylidene chloride copolymers by gel-permeation chromatography and viscometry", J. Polym. Sci., Part A: Polym. Chem., 1976, vol. 14, pp. 2263-2273—John Wiley & Sons, Inc.

Severac R. et al., "Vinylidene chloride copolymerization with methyl acrylate by reversible addition-fragmentation chain transfer (RAFT) process", Rapra Abstracts, Rapra Technology Ltd., Shrewsbury, GB, Sep. 1, 2003 (Sep. 1, 2003), vol. 40, No. 9, p. 39, XP001178507, ISSN: 0033-6750.

* cited by examiner

Scheme I: Mechanism of RAFT/MADIX polymerization (from A. Favier, M-T Charreyre, Macromol. Rapid. Commun., 2006, 27, 653)
*Initiation:*
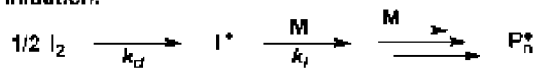
*Chain transfer:*
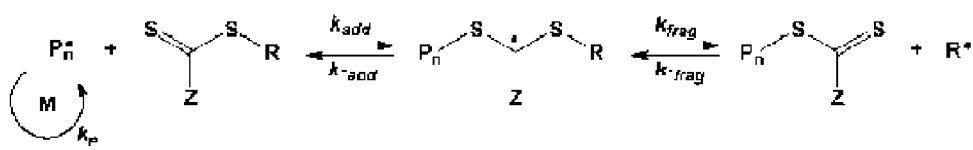
*Re-initiation:*
*Equilibrium between active and dormant chains:*
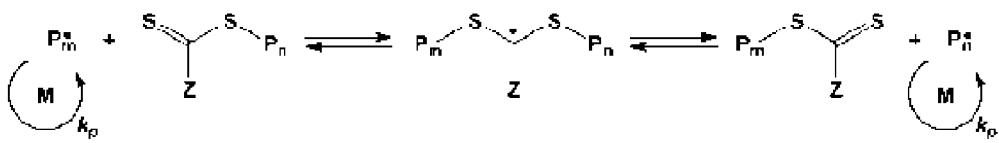
*Termination:*
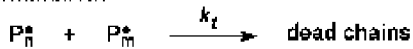

PROCESS FOR THE PREPARATION OF A VINYLIDENE CHLORIDE POLYMER COMPOSITE

This application is a U.S. national stage entry under 35 U.S.C. §371 of International Application No. PCT/EP2012/075951 filed Dec. 18, 2012, which claims priority to European application No. 11306729.2, filed on 21 Dec. 2011, to European application No. 12305133.6, filed on Jul. 2, 2012, and to European application No. 12306139.2, filed on 21 Sep. 2012. The entire contents of these applications are explicitly incorporated herein by this reference.

TECHNICAL FIELD

The invention relates to a process for preparing composites comprising a vinylidene chloride polymer and a solid particulate material. The process comprises polymerizing vinylidene chloride at the surface of a solid particulate material under the control of a RAFT/MADIX agent. The invention further relates to the vinylidene chloride polymer composite obtained from the process and to the compositions obtainable therefrom.

BACKGROUND ART

Vinylidene chloride polymers are typically prepared by a radical polymerization process; see for instance Ullmann's Encyclopedia of Industrial Chemistry. Poly(vinylidene chloride). Edited by WILEY. Weinheim: Wiley VCH-Verlag, 2005.

Over the past decade, various controlled radical polymerization techniques have been developed. Among these reversible addition-fragmentation chain transfer (RAFT) and macromolecular design via inter-exchange of xanthate (MADIX) have provided an advantageous route to so-called living polymerization processes, see for instance PERRIER, S., et al. Macromolecular design via Reversible Addition-Fragmentation Chain Transfer (RAFT)/Xanthates (MADIX) polymerization. *J. Polym. Sci.: Part A: Polym. Chem.* 2005, vol. 43, p. 5347-5393.

The use of RAFT or MADIX controlled radical polymerization agents, hereinafter referred to as "RAFT/MADIX agents", has been disclosed for instance WO 98/058974 A (RHODIA CHIMIE) Dec. 30, 1998 and WO 98/01478 A (E.I. DUPONT DE NEMOURS AND COMMONWEALTH SCIENTIFIC AND INDUSTRIAL RESEARCH ORGANIZATION) Jan. 15, 1998 1998.

The use of a RAFT agent in the preparation of polymer encapsulated solid particulates has been disclosed for instance in WO 2006/037161 A (THE UNIVERSITY OF SYDNEY) Apr. 13, 2006 which however does not disclose the preparation of composites comprising a vinylidene chloride polymer.

BEIJA, J. D., et al. RAFT/MADIX polymers for the preparation of polymer inorganic nanohybrids. *Progress in Polymer Science.* 2011, vol. 36, p. 845-886. also discloses the preparation of polymer/inorganic nanohybrids using RAFT/MADIX controlled radical polymerization, nanohybrids wherein the polymer is a vinylidene chloride polymer are however not disclosed.

SUMMARY OF INVENTION

Thus a first objective of the present invention is to provide a process for the preparation of a vinylidene chloride polymer composite comprising a solid particulate encapsulated in a vinylidene chloride polymer.

A second objective of the present invention is a vinylidene chloride polymer composite comprising a solid particulate encapsulated in a vinylidene chloride polymer matrix.

A third objective of the present invention is a composition comprising the vinylidene chloride polymer composite, in particular a coating composition.

BRIEF DESCRIPTION OF THE DRAWINGS

FIG. 1 is a scheme depicting a mechanism of RAFT/MADIX polymerization.

DESCRIPTION OF INVENTION

According to a first object of the present invention there is provided a process for the preparation of a vinylidene chloride polymer composite which comprises:
 providing a dispersion of a solid particulate material in a liquid phase, said dispersion comprising a RAFT/MADIX agent;
 providing vinylidene chloride and optionally at least one ethylenically unsaturated monomer copolymerizable therewith to said dispersion; and
 polymerizing vinylidene chloride and optionally said at least one ethylenically unsaturated monomer copolymerizable therewith under the control of the RAFT/MADIX agent to form a vinylidene chloride polymer at the surface of the solid particulate material.

The expression "vinylidene chloride polymer composite" is used in the present specification to denote a composite comprising a solid particulate encapsulated in the vinylidene chloride polymer. With the phrase "solid particulate encapsulated in the vinylidene chloride polymer" is meant herein that the vinylidene chloride polymer entirely surrounds, homogenously or inhomogeneously, the solid particulate material or that the vinylidene chloride polymer surrounds only in part the solid particulate material.

The solid particulate material may consist of one or several individual solid particles aggregated together at least partially surrounded by a vinylidene chloride layer forming basically the outer surface of the solid particulate material. The thickness of the polymer surrounding the solid particulate material may be relatively constant. However, it may be that the thickness of the encapsulating polymer can vary gradually around the perimeter of the solid particulate material. For example, the solid particulate material may not be located at the precise centre of a spherical polymer coating. The uniformity and continuity of the vinylidene chloride polymer coating surrounding the solid particulate material can generally be visually determined, for example by Transmission Electron Microscopy (TEM).

The thickness of the vinylidene chloride polymer coating which encapsulates the solid particulate material is preferably at least 1 nm, more preferably at least 2 nm, most preferably at least 5 nm, still more preferably at least 10 nm. There is no particular limit as to the thickness of vinylidene chloride polymer that can encapsulate the solid particulate material, with the ultimate thickness generally being dictated by the intended application for the composite.

The solid particulate material can be of any type, shape or size provided that it can be dispersed in the liquid phase.

The solid particulate material typically comprises an inorganic material. Suitable inorganic materials are those selected from the group consisting of cerium dioxide, titanium dioxide, silicon dioxide and combinations thereof.

Solid particulate materials having a so-called "core/shell structure" wherein the shell component of the particle is selected from the list of oxides recited above are also within the scope of the present invention. The core component of the core/shell particle may be made of a material selected from the list of oxides recited above different from the shell component or from another inorganic material with no limitation. Notable examples of suitable core/shell particles are for instance those having a cerium dioxide core and a silicon dioxide shell or those having a titanium dioxide core and a silicon dioxide shell.

Preferably the solid particulate material comprises cerium dioxide.

Typically, the average particle size of the solid particulate material, as measured by dynamic light scattering, for instance using the method as described in ISO Norm ISO 22412:2008(E), is advantageously of at least 3 nm, preferably at least 3 nm, more preferably at least 5 nm. The average particle size of the solid particulate material is preferably not greater than 100 microns, typically not greater than 10 microns, and even more typically not greater than 5 microns. Good results have been obtained when the average particle size of the solid particulate material is from 1 to 300 nm, preferably from 5 to 200 nm, more preferably from 10 to 150 nm. An average particle size of the solid particulate material in the range of from 20 to 100 nm has also been found suitable to provide composites with advantageous properties.

The expression "vinylidene chloride polymer" is used herein to indicate a polymer comprising at least 50 wt % of recurring units deriving from vinylidene chloride. Typically, the amount of vinylidene chloride in the vinylidene chloride polymer varies from 50 to 99.5 wt %, preferably from 60 to 98 wt % and more preferably from 65 to 95 wt %.

Non-limiting examples of suitable ethylenically unsaturated monomers copolymerizable with vinylidene chloride that can be used in the process of the present invention, are for instance vinyl chloride, vinyl esters such as for example vinyl acetate, vinyl ethers, acrylic acids, their esters and amides, methacrylic acids, their esters and amides, acrylonitrile, methacrylonitrile, styrene, styrene derivatives, such as styrene sulfonic acid and its salts, vinyl phosphonic acid and its salts, butadiene, olefins such as for example ethylene and propylene, itaconic acid, maleic anhydride, but also copolymerizable emulifiers such as 2-acrylamido-2-methylpropanesulphonic acid (AMPS) or one of its salts, e.g. the sodium salt, 2-sulphoethylmethacrylic acid (2-SEM) or one of its salts, e.g. the sodium salt, and the phosphate ester of methacrylate-terminated polypropylene glycol (such as the product SIPOMER® PAM-200 from Rhodia) or one of its salts, e.g. the sodium salt, poly(ethylene oxide) methyl ether acrylate (PEOA), poly(ethylene oxide) methyl ether methacrylate (PEOMA).

Preferably, the ethylenically unsaturated monomer copolymerizable with vinylidene chloride used in the process of the invention is selected from the group consisting of vinyl chloride, maleic anhydride, itaconic acid, styrene, styrene derivatives, and the acrylic or methacrylic monomers corresponding to general formula (I):

$$CH_2=CR_1R_2 \quad (I)$$

in which $R_1$ is chosen from hydrogen and —$CH_3$ and $R_2$ is chosen from —CN and —$COR_3$, wherein $R_3$ is chosen from —OH, —$OR_4$, wherein $R_4$ is a $C_1$-$O_{18}$ linear or branched alkyl group optionally bearing one or more —OH groups, a $C_2$-$O_{10}$ epoxyalkyl group and a $C_2$-$C_{10}$ alkoxyalkyl group and wherein $R_3$ is also chosen from the —$NR_5R_6$ radicals in which $R_5$ and $R_6$, which are the same or different, are chosen from hydrogen and $C_1$-$C_{10}$ alkyl groups, optionally bearing one or more —OH groups, the aforementioned copolymerizable surfactants and the phosphate ester of methacrylate-terminated polypropylene glycol or one of its salts, poly(ethylene oxide) methyl ether acrylate (PEOA), poly(ethylene oxide) methyl ether methacrylate (PEOMA).

More preferably, the ethylenically unsaturated monomer copolymerizable with vinylidene chloride used in the process of the invention is selected from the group consisting of vinyl chloride, maleic anhydride, itaconic acid, the acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, N,N-di(alkyl)acrylamide, 2-acrylamido-2-methylpropanesulphonic acid (AMPS) or one of its salts, 2-sulphoethylmethacrylic acid (2-SEM) or one of its salts, and the phosphate ester of methacrylate-terminated polypropylene glycol or one of its salts, poly(ethylene oxide) methyl ether acrylate (PEOA), poly(ethylene oxide) methyl ether methacrylate (PEOMA).

Even more preferably, the at least one ethylenically unsaturated monomer copolymerizable with vinylidene chloride is selected from the group consisting of maleic anhydride, itaconic acid, the acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, N,N-di(alkyl)acrylamide, 2-acrylamido-2-methylpropanesulphonic acid (AMPS) or one of its salts, 2-sulphoethylmethacrylic acid (2-SEM) or one of its salts, and the phosphate ester of methacrylate-terminated polypropylene glycol or one of its salts, poly(ethylene oxide) methyl ether acrylate (PEOA), poly(ethylene oxide) methyl ether methacrylate (PEOMA).

Most preferably, the at least one ethylenically unsaturated monomer copolymerizable with vinylidene chloride is selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, N,N-di(alkyl)acrylamide, poly(ethylene oxide) methyl ether acrylate (PEOA), poly(ethylene oxide) methyl ether methacrylate (PEOMA).

The process of the invention is carried out in the presence of a RAFT/MADIX agent. The expression "RAFT/MADIX agent", which for the avoidance of doubt is intended to mean "RAFT or MADIX agent", is used in the present specification to refer to a class of compounds containing the functional group —X(=S)—S—, wherein X is phosphorous or carbon, preferably carbon. MADIX agents are characterized by the presence of the xanthate functional group, namely the —O—C(=S)—S— group.

RAFT/MADIX agents are capable to act as a reversible chain transfer agent in free-radical polymerizations, thereby inducing reversible-addition fragmentation transfer reactions to create an equilibrium between propagating radicals (i.e. the growing polymer chain) and so-called dormant species (containing the chain transfer agent fragment) that can become active again. The generally accepted mechanism of RAFT/MADIX controlled radical polymerization is shown in Scheme I.

Any RAFT/MADIX agent known in the art may be used in the inventive process. Non-limiting examples of suitable RAFT/MADIX agents are those disclosed in WO 98/058974 A (RHODIA CHIMIE) Dec. 30, 1998 and in WO 98/01478 A ((E.I. DUPONT DE NEMOURS AND COMMONWEALTH SCIENTIFIC AND INDUSTRIAL RESEARCH ORGANIZATION) Jan. 15, 1998 and in FAVIER, A., et al. Experimental requirements for an efficient control of free-radical polymerizations via the Reversible-Addition Fragmentation chain Transfer (RAFT) process. *Macromol. Rapid Commun.* 2006, vol. 27, p. 653-692.

In a first embodiment of the process of the invention suitable RAFT/MADIX agents include those of general formula (II):

(II)

where $R_a$ is an organic group optionally substituted with one or more hydrophilic groups and Z is any group that can promote sufficient reactivity of the thiocarbonyl group towards radical addition.

$R_a$ may be selected from $C_1$-$C_6$ alkyl, $C_1$-$C_6$ alkoxy, aryl or heteroaryl, each of which may be substituted with one or more hydrophilic groups selected from —$CO_2H$, —$CO_2R$, —CN, —$SO_3H$, —$OSO_3H$, —SOR, —$SO_2R$, —$OP(OH)_2$, —$P(OH)_2$, —$PO(OH)_2$, —OH, —OR, —$(OCH_2$—$CHR^0)_w$—OH, —$(OCH_2$—$CHR^0)_w$—OR, —$CONH_2$, $CONHR^1$, $CONR^1R^2$, —$NR^1R^2$, —$NR^1R^2R^3$, where R is selected from $C_1$-$C_6$ alkyl, w is an integer from 1 to 10, $R^0$ is selected from hydrogen or R, $R^1$, $R^2$ and $R^3$ are independently selected from $C_1$-$C_6$ alkyl and aryl which are optionally substituted with one or more hydrophilic substituent selected from —$CO_2H$, —$SO_3H$, —$OSO_3H$, —OH, —$(OCH_2CHR^0)_w$—OH, —$CONH_2$, —SOR and $SO_2R$, and salts thereof, wherein R, $R^0$ and w are as defined above.

Preferably $R_a$ is selected, without limitation, from the group consisting of: —$CH(CH_3)CO_2H$, —$CH(CO_2H)$ $CH_2CO_2H$, —$C(CH_3)_2CO_2H$, —$CH_2(C_6H_5)$, —C(CN) $(CH_3)CO_2H$, —$C(CN)(CH_3)(CH_2)_2CO_2H$.

As used herein, the terms "aryl" and "heteroaryl" refer to any substituent which includes or consists of one or more aromatic or heteroaromatic ring respectively, and which is attached via a ring atom. The rings may be mono or polycyclic ring systems, although mono or bicyclic 5 or 6 membered rings are preferred. The term "alkyl", used either alone or in combination, as in "alkenyloxyalkyl", "alkylthio", "alkylamino" and "dialkylamino" denotes straight chain, branched or cyclic alkyl, preferably $C_1$-$C_{20}$ alkyl or cycloalkyl. The term "alkoxy" denotes straight chain or branched alkoxy, preferably $C_1$-$C_{20}$ alkoxy. Examples of alkoxy include methoxy, ethoxy, n-propoxy, isopropoxy and the different butoxy isomers. The term "alkenyl" denotes groups formed from straight chain, branched or cyclic alkenes including ethylenically mono-, di- or poly-unsaturated alkyl or cycloalkyl groups as previously defined, preferably $C_2$-$C_{20}$ alkenyl. The term "acyl" either alone or in combination, as in "acyloxy", "acylthio", "acylamino" or "diacylamino", denotes carbamoyl, aliphatic acyl group and acyl group containing an aromatic ring, which is referred to as aromatic acyl or a heterocyclic ring which is referred to as heterocyclic acyl, preferably $C_1$-$C_{20}$ acyl.

In formula (II) above Z may be selected among optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O) $(OR^4)_2$], dialkyl- or diaryl-phosphinyl [—P(=O)$R^4_2$], where $R^4$ is selected from the group consisting of optionally substituted $C_1$-$C_{18}$ alkyl, optionally substituted $C_2$-$C_{18}$ alkenyl, optionally substituted aryl, optionally substituted heterocyclyl, optionally substituted arylalkyl, optionally substituted alkaryl, optionally substituted acylamino, optionally substituted acylimino, optionally substituted amino, a polymer chain formed by any mechanism, for example polyalkylene oxide polymers such as water soluble polyethylene glycol or polypropylene glycol, and alkyl end capped derivatives thereof. Optional substituents for $R^4$ and Z groups include epoxy, hydroxy, alkoxy, acyl, acyloxy, carboxy (and its salts), sulfonic acid (and its salts), alkoxy- or aryloxy-carbonyl, isocyanato, cyano, silyl, halo, and dialkylamino.

Preferably, Z is selected among optionally substituted alkoxy, optionally substituted aryloxy, optionally substituted alkylthio, optionally substituted arylalkylthio, dialkoxy- or diaryloxy-phosphinyl [—P(=O)$(OR^4)_2$], dialkyl- or diaryl-phosphinyl [—P(=O)$R^4_2$], where $R^4$ is as defined above.

More preferably Z is selected, without limitation, from the group consisting of: —$OR^5$, —$SR^5$, where $R^5$ is an optionally substituted $C_1$-$C_{20}$ alkyl, —$NR^5R^6$ wherein $R^5$ is as defined and $R^6$ is selected from optionally substituted $C_1$-$C_{20}$ and alkyl optionally substituted aryl, and

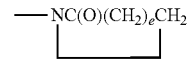

wherein e is an integer from 2 to 4.

Most preferably, Z is selected, without limitation, from the group consisting of —$SCH_2(C_6H_5)$, —$S(CH_2)_uCO_2H$ wherein u is an integer from 2 to 11, —$SC_zH_{2z+1}$, —$OC_zH_{2z+1}$, wherein z is an integer from 1 to 12, preferably from 2 to 12, such as 2, 3, 4, 6, 8, 10, 12, —$SCH_2CH_2OH$, —$OCH_2CF_3$, —$N(C_6H_5)(CH_3)$.

In a second embodiment of the invention RAFT/MADIX agents suitable for use in the process include those of general formula (III):

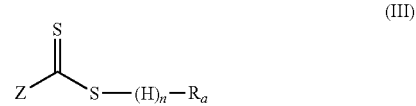

(III)

where Z and $R_a$ are as defined above.

In formula (III) each H is independently a polymerised residue of an ethylenically unsaturated monomer and n is an integer from 1 to 300, even from 1 to 100, preferably from 1 to 60, more preferably from 1 to 50, and even more preferably from 1 to 20. In some instances n may be an integer from 1 to 15, even from 1 to 10.

RAFT/MADIX agents of formula (III) can be prepared by carrying out the controlled polymerization reaction of at least one ethylenically unsaturated monomer precursor to —(H)— in the presence of a RAFT/MADIX agent of formula (II), under polymerization conditions disclosed in the art.

The RAFT/MADIX agents of formulas (II) and (III) typically have structural features that enable them to physically associate with the solid particulate material. Generally the RAFT/MADIX agent is physically associated with the solid particulate material by being adsorbed onto its outermost surface, the affinity of the RAFT/MADIX agent for the surface of the solid particulate material may be controlled in a number of ways.

For example, with reference to formula (III), the RAFT agent may derive its surface affinity through one or more of the —Z group, —(H)$_n$— group, and the —R$_a$ group. The surface affinity afforded by the Z, —(H)$_n$—, and R$_a$ groups will typically result from one or more of these groups themselves comprising group(s), section(s), or region(s) having a combination of hydrophilic and hydrophobic properties.

Advantageously said surface affinity may be provided by the —(H)$_n$— group in the RAFT/MADIX agent of formula (III).

In a preferred aspect of the invention the —(H)$_n$— group comprises recurring units deriving from at least one ethylenically unsaturated monomer having hydrophilic character (h1) and from at least one ethylenically unsaturated monomer having hydrophobic character (h2).

The terms "hydrophilic" and "hydrophobic" are used throughout the present specification with their commonly recognised meaning, that is to refer to compounds and/or functional parts of compounds "provided with a tendency to bind or absorb water" (hydrophilic) or "incapable of dissolving in water" (hydrophobic).

The —(H)$_n$— group may comprise recurring units deriving from one ethylenically unsaturated monomer having hydrophilic character (h1) and from one ethylenically unsaturated monomer having hydrophobic character (h2).

The —(H)$_n$— group may alternatively comprise recurring units deriving from more than one ethylenically unsaturated monomer having hydrophilic character (h1) and/or from more than one ethylenically unsaturated monomer having hydrophobic character (h2). In an advantageous aspect of this embodiment the —(H)$_n$— group comprises recurring units deriving from two ethylenically unsaturated monomers having hydrophilic character (h1) and from one ethylenically unsaturated monomer having hydrophobic character (h2). Other combinations are however possible and within the scope of the present invention.

Recurring units deriving from monomers (h1) and/or (h2) in group —(H)$_n$— may be arranged either in a random, alternating, gradient or block copolymer structure. The expression "arranged in a random structure" is intended to denote a distribution of the monomers which is random and the proportion of which is statistically the same within group —(H)$_n$—. The expression "arranged in an alternating structure" is intended to denote a distribution in which the monomers composing group —(H)$_n$— are linked together alternately. The expression "arranged in a block structure" is intended to denote a distribution in which a linking of more or less lengthy sequences formed of the same monomer or monomers is observed. The expression "arranged in a gradient structure" is intended to denote a structure of at least two monomers in which the relative proportion of one monomer with respect to the other(s) increases or decreases all along the chain.

In an embodiment the RAFT/MADIX agent could have a block arrangement of the hydrophilic and hydrophobic recurring units as represented by formulas (IVa) and (IVb):

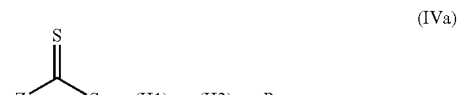

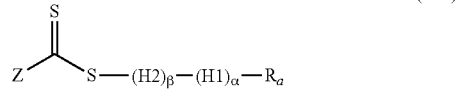

where H1 represents a hydrophilic block comprising recurring units deriving from at least one ethylenically unsaturated monomer having hydrophilic character (h1); H2 represents a hydrophobic block comprising recurring units deriving from at least one ethylenically unsaturated monomer having hydrophobic character (h2); and α and β are independently an integer from 1 to 99, typically from 1 to 50, preferably from 1 to 30, even preferably from 1 to 20, more preferably from 1 to 15. In some instances α and β may advantageously be, independently of each other, an integer from 1 to 10, even from 1 to 5.

In another embodiment the RAFT/MADIX agent could be characterised by a random arrangement of hydrophilic and hydrophobic recurring units as represented by formulas (Va) and (Vb):

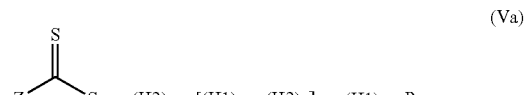

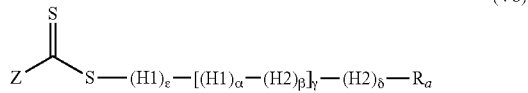

wherein H1, H2, α and β are as defined above, and δ and ε are independently an integer from 1 to 10, preferably from 1 to 5, each repeat unit y may be the same or different, and wherein y is an integer from 1 to 10, preferably from 1 to 5, more preferably from 1 to 3.

In still another embodiment the RAFT/MADIX agent could have the following alternating structures (VIa) and (VIb):

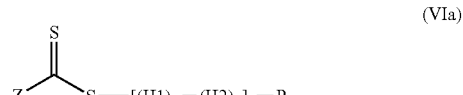

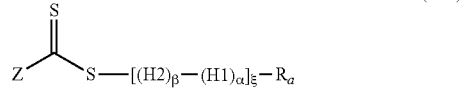

where H1, H2, α and β are as defined above, and ξ is an integer from 1 to 50, preferably from 2 to 25, more preferably from 2 to 10.

Each of H1 and/or H2 in anyone of formulas (IVa), (IVb), (Va), (Vb), (VIa) and (VIb) may independently comprise only one recurring unit deriving from at least one ethylenically unsaturated monomer having hydrophilic character (h1) or hydrophobic character (h2).

Each H1 and/or H2 in anyone of formulas (IVa), (IVb), (Va), (Vb), (VIa) and (VIb) may comprise recurring units deriving from more than one type of ethylenically unsaturated monomer having hydrophilic character (h1) or hydrophobic character (h2).

Groups Z and $R_a$ in anyone of formulas (IVa), (IVb), (Va), (Vb), (VIa) and (VIb) are as defined above for RAFT/MADIX agents of formula (II).

In any one of the RAFT/MADIX agents of formulas (II) to (VI) group Z may be a polymer chain formed by any mechanism. Such a polymer chain may be the same or different from the —$(H)_n$— group in the RAFT/MADIX agent of formula (III) or of any of its variants in formulas (IVa), (IVb), (Va), (Vb), (VIa) and (VIb) as defined above.

Provided that the RAFT/MADIX agent exhibits surface affinity for the solid particulate material, the present invention is intended to embrace all such structures. In this respect, to improve the affinity of the RAFT/MADIX agent with the surface of the solid particulate material, it may be advantageous to employ a RAFT/MADIX agent having an overall ionic charge opposite to the ionic charge present on the surface of the solid particulate material.

Preferably the RAFT/MADIX agent used in the inventive process comprises a random succession of hydrophilic regions (H1) and of hydrophobic regions (H2) as shown in formulas (Va) or (Vb).

Suitable ethylenically unsaturated monomers having hydrophilic character (h1) are typically selected among those comprising at least one carboxylic, sulfonic, sulfuric, phosphonic, phosphoric acid functional group, their salt or precursor thereof.

Among monomers (h1) comprising at least one carboxylic functional group or precursor thereof mention may be made for instance of α-β-ethylenically unsaturated carboxylic acids and the corresponding anhydrides, such as acrylic acid, acrylic anhydride, methacrylic acid, methacrylic anhydride, maleic acid, maleic anhydride, fumaric acid, itaconic acid, N-methacryloylalanine, N-acryloylglycine, p-carboxystyrene, and their water-soluble salts. Among the monomers (h1) comprising at least one carboxylic functional group, acrylic acid or methacrylic acid may be favoured.

Among monomers (h1) comprising at least one sulfuric or sulfonic functional group, or precursors thereof, mention may be made for instance of vinyl sulfonic acid, styrene sulfonic acid, 2-acrylamido-2-methylpropane sulfonic acid (AMPS), 3-[N-(2-methacryloyloxyethyl)-N,N-dimethylammonio]propane sulfonic acid, 3-[N,N-dimethylvinylbenzylammonio)propane sulfonic acid, 3-[2-(N-methacrylamido)-ethyldimethylammonio]propane sulfonic acid, 3-(methacryloyloxy)propane sulfonic acid, 3-(acryloyloxy) propane sulfonic acid, 2-(methacryloyloxy)ethane sulfonic acid, 2-(acryloyloxy)ethane sulfonic acid, 2-methylenesuccinic acid bis(3-sulfopropyl) ester, 3-[N-(3-methacrylamidopropyl)-N,N-dimethyl]ammoniopropane sulfonic acid, (2-vinylpyridinio)propane sulfonic acid and their corresponding salts and sulfate analogs. Among the monomers (h1) comprising at least one sulfonic functional group, 2-acrylamido-2-methylpropane sulfonic acid (AMPS) may be favoured.

Monomers comprising precursors of sulfonic acid functional groups may be chosen, from example, from n-butyl p-styrenesulfonate, neopentyl p-styrene sulfonate, which produces a sulfonic acid functional group, or its salt, by hydrolysis after polymerization.

Notable examples of monomers (h1) comprising a phosphonic acid or phosphonic acid precursor are for instance: N-methacrylamidomethylphosphonic acid ester derivatives, in particular the n-propyl ester, the methyl ester, the ethyl ester, the n-butyl ester or the isopropyl ester, and their phosphonic monoacid and diacid derivatives, such as N-methacrylamidomethylphosphonic diacid; N-methacrylamidoethylphosphonic acid ester derivatives, such as N-methacrylamidoethylphosphonic acid dimethyl ester or N-methacrylamidoethylphosphonic acid di(2-butyl-3,3-dimethyl)ester, and their phosphonic monoacid and diacid derivatives, such as N-methacrylamidoethylphosphonic diacid; N-acrylamidomethylphosphonic acid ester derivatives, such as N-acrylamidomethylphosphonic acid dimethyl ester, N-acrylamidomethylphosphonic acid diethyl ester or bis(2-chloropropyl)N-acrylamidomethylphosphonate, and their phosphonic monoacid and diacid derivatives, such as N-acrylamidomethylphosphonic acid; vinylbenzylphosphonate dialkyl ester derivatives, in particular the di(n-propyl), di(isopropyl), diethyl, dimethyl, di(2-butyl-3,3'-dimethyl) and di(t-butyl) ester derivatives, and their phosphonic monoacid and diacid alternative forms, such as vinylbenzylphosphonic diacid; diethyl 2-(4-vinylphenyl)ethanephosphonate; dialkylphosphonoalkyl acrylate and methacrylate derivatives, such as 2-(acryloyloxy)ethylphosphonic acid dimethyl ester and 2-(methyacryloyloxy)ethylphosphonic acid dimethyl ester, 2-(methacryloyloxy)methylphosphonic acid diethyl ester, 2-(methacryloyloxy)methylphosphonic acid dimethyl ester, 2-(methacryloyloxy)propylphosphonic acid dimethyl ester, 2-acryloyloxy)methylphosphonic acid diisopropyl ester or 2-(acryloyloxy)ethylphosphonic acid diethyl ester, and their phosphonic monoacid and diacid alternative forms, such as 2-(methacryloyloxy)ethylphosphonic acid, 2-(methacryloyloxy)methylphosphonic acid, 2-(methacryloyloxy)propylphosphonic acid, 2-(acryloyloxy)propylphosphonic acid and 2-acryloyloxy)ethylphosphonic acid; vinylphosphonic acid, optionally substituted by cyano, phenyl, ester or acetate groups, vinylidenephosphonic acid, in the form of a salt or the form of its isopropyl ester, or bis(2-chloroethyl)vinylphosphonate. Among the monomers (h1) comprising at least one phosphonic acid functional group, vinylbenzylphosphonic diacid may be favoured.

Ethylenically unsaturated monomers (h1) can also be chosen from the phosphate analogs of the phosphonate-comprising monomers described above. Mention may be made, as specific phosphate-comprising monomers, of: 2-(methacryloyloxy)ethyl phosphate, 2-(acryloyloxy)ethyl phosphate, 2-(methacryloyloxy)propyl phosphate, 2-(acryloyloxy)propyl phosphate, and acrylates or methacrylates of polyethylene glycol omega phosphates or acrylates or methacrylates of polypropylene glycol omega phosphates.

Among non-ionic ethylenically unsaturated monomers having hydrophilic character (h1) mention may be made of 2-hydroxyethyl acrylate, 2-hydroxyethyl methacrylate, N,N-dimethylacrylamide, N-vinyl-2-pyrrolidone.

Among ethylenically unsaturated monomers having hydrophilic character (h1) comprising cationic functional groups mention may be made of dimethylaminoethylmethacrylate and its quaternary ammonium salts, N-vinylpyridine and its quaternary ammonium salts, vinylbenzylchloride and its quaternary ammonium salts.

Preferred ethylenically unsaturated monomers having hydrophilic character (h1) are selected among those having an anionic functional group or a precursor thereof.

Advantageously, the ethylenically unsaturated monomer having hydrophilic character (h1) is selected without limitation, from the group consisting of acrylic or methacrylic acids, vinyl phosphonic acid, such as vinylbenzylphosphonic diacid, vinyl sulfonic acid, styrene sulfonic acid, and 2-acrylamido-2-methylpropane sulfonic acid, their salts or their precursors.

Typically preferred ethylenically unsaturated monomers having hydrophilic character (h1) are characterized in that they contain functional groups whose corresponding acid has an acid dissociation constant pKa of less than 6, preferably of less than 5, more preferably of less than 4.5 and even more preferably of less than 4.

Suitable ethylenically unsaturated monomers having a hydrophobic character (h2) are for instance those selected from the group consisting of: styrene and styrene derivatives, such as α-methylstyrene, p-methylstyrene or p-(t-butyl) styrene; esters of acrylic or methacrylic acid, such as methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate, isobutyl methacrylate; $C_3$-$C_{12}$ vinyl nitriles, e.g. acrylonitrile or methacrylonitrile; vinyl esters of carboxylic acids, such as vinyl or allyl acetates, propionates, stearates; vinyl halides, vinylidene halides, or vinylaromatic halides, e.g. vinyl chloride, vinylidene chloride or pentafluorostyrene; α-olefins, such as ethylene; conjugated diene monomers, for examples butadiene, isoprene, chloroprene; and monomers capable of generating polydimethylsiloxane chains (PDMS). Among ethylenically unsaturated monomers having a hydrophobic character (h2) n-butyl acrylate and styrene may be preferred.

It will be appreciated by those skilled in the art that the hydrophilic/hydrophobic character of the RAFT/MADIX agent will be selected depending on the nature of the solid particulate material and of the liquid phase in which the process is carried out.

Non limiting examples of specific combinations of hydrophilic/hydrophobic monomers for the preparation of the —(H)$_n$— group are for instance acrylic acid/n-butyl acrylate; vinylbenzylphosphonic diacid/styrene; 2-acrylamido-2-methylpropane sulfonic acid (AMPS)/n-butyl acrylate; AMPS/acrylic acid/n-butyl acrylate.

Specific examples of the RAFT/MADIX agents of formula (III) which have been found useful in the inventive process are for instance: a poly[(butyl acrylate)$_p$-co-(acrylic acid)$_q$]-RAFT agent wherein the recurring units deriving from butyl acrylate and acrylic acid are randomly distributed and wherein $2 \leq p \leq 20$, preferably $2 \leq p \leq 15$, and $2 \leq q \leq 25$, preferably $3 \leq q \leq 20$; a poly[(butyl acrylate)$_{p'}$-co-(acrylic acid)$_{q'}$-co-(AMPS)$_{r'}$]-RAFT agent wherein the recurring units deriving from n-butyl acrylate, AMPS and acrylic acid are randomly distributed and wherein $2 \leq p' \leq 20$, preferably $2 \leq p' \leq 10$; $2 \leq q' \leq 25$, preferably $3 \leq q' \leq 15$; and $1 \leq r \leq 15$, preferably $2 \leq r \leq 10$; a poly[(vinylbenzylphosphonic diacid)$_s$-co-(styrene)$_t$]-RAFT agent wherein the recurring units deriving from vinylbenzylphosphonic diacid and styrene are randomly distributed and wherein $2 \leq s \leq 20$, preferably $2 \leq s \leq 15$; $1 \leq t \leq 15$, preferably $2 \leq t \leq 8$.

Any liquid phase may be used in the inventive process provided the solid particulate material and the RAFT/MADIX agent can be dispersed therein.

In practical terms, the liquid phase functions as a reaction medium in which vinylidene chloride and the one or more ethylenically unsaturated monomer are polymerised to form a vinylidene chloride polymer at the surface of the solid particulate material. The monomer(s) may be present in the liquid phase as a separate liquid phase, it may be fully soluble in the liquid phase, or the liquid phase may itself consist essentially of the monomer(s).

The process may in fact be carried out in a liquid phase essentially comprising vinylidene chloride and any optional ethylenically unsaturated monomer polymerizable with vinylidene chloride.

Alternatively, the process may be carried out in the presence of a liquid phase different from vinylidene chloride and the optional ethylenically unsaturated monomer. The liquid phase may be either formed of an organic solvent or it may be water.

In a preferred embodiment of the process of the invention, the liquid phase is water and the process produces an aqueous dispersion of vinylidene chloride polymer composite.

When the liquid phase is water the process may be an emulsion radical polymerization process, that is a radical polymerization process which is carried out in an aqueous medium in the presence of emulsifying agents and radical initiators which are soluble in water.

Alternatively, when the liquid phase is water the process may be a suspension polymerization process, that is a radical polymerization process in which oil-soluble initiators are employed and an emulsion of droplets of monomers is produced by virtue of powerful mechanical stirring and the presence of emulsifying or suspension agents.

Where the method of the invention is performed using a continuous liquid phase which does not consist essentially of vinylidene chloride and the one or more optional ethylenically unsaturated monomer, it is preferred that the monomer(s) is introduced to the liquid phase after the solid particulate material and the RAFT/MADIX agent interact so as to provide for a stable dispersion.

In accordance with the process of the invention, vinylidene chloride and optionally at least one ethylenically unsaturated monomer are polymerised under the control of the RAFT/MADIX agent of any one of formulas (II), (III), (IVa), (IVb), (Va), (Vb), (VIa) and (VIb) to form polymer at the surface of the solid particulate material.

The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), redox initiating systems, photochemical initiating systems or high energy radiation such as electron beam, X- or gamma-radiation. The initiating system is chosen such that under the reaction conditions there is no substantial adverse interaction of the initiator or the initiating radicals with the RAFT/MADIX agent under the conditions of the reaction. Thermal initiators and redox initiating systems have been found to be suitable initiating systems. Redox initiating systems, e.g. those based on persulfate salts (e.g. sodium, potassium or ammonium persulfate) and sodium metabisulfite, have been found to be particularly suitable.

Other conventional additives may be added to the liquid phase during the polymerization process, such as dispersants, oxidants, surfactants, pH regulators as conventionally known in the art.

Advantageously it might be possible to carry out an emulsion polymerization process of vinylidene chloride on the surface of a solid particulate material without the addition of any surfactant when the RAFT/MADIX agent is selected among those of formulas (III), (IVa), (IVb), (Va), (Vb), (VIa) and (VIb).

The process of the invention may be operated in batch, semi-continuous or continuous modes. Where the liquid phase consists essentially of vinylidene chloride and any optional ethylenically unsaturated monomer that are polymerised to form the polymer, the method is preferably operated in batch mode, and where the liquid phase does not consist essentially of vinylidene chloride and any optional ethylenically unsaturated monomer that are polymerised to form the polymer, the method is preferably operated in semi-continuous or continuous modes.

At the end of the process the vinylidene chloride polymer composite may be either isolated as a solid from the liquid phase or, for instance when the liquid phase is water, used as an aqueous dispersion.

Conventional techniques can be used for the isolation of the vinylidene chloride polymer composite from the liquid phase.

The composite may be subjected to further finishing treatments before use, such as a treatment for the removal of the RAFT/MADIX agent as disclosed for instance in WO 02/090397 A (RHODIA CHIMIE) Nov. 14, 2002.

Accordingly a second object of the present invention is a vinylidene chloride polymer composite comprising a solid particulate material encapsulated in a vinylidene chloride polymer.

The definitions and preferences defined previously within the context of the process for preparing a vinylidene chloride polymer composite also apply to the vinylidene chloride polymer composite, with particular reference to the composition of the vinylidene chloride polymer and the nature and size of the solid particulate material.

In a first embodiment the vinylidene chloride polymer composite comprises a solid particulate material comprising cerium dioxide, preferably consisting of cerium dioxide, and a vinylidene chloride polymer comprising at least 50 wt % of recurring units deriving from vinylidene chloride and at most 50 wt % of recurring units deriving from one or more ethylenically unsaturated monomer selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide.

The cerium dioxide has an average particle size of from 1 to 250 nm, preferably form 2 to 150 nm.

The amount of the solid particulate material in the vinylidene chloride polymer composite is typically of at least 0.05 wt % with respect to the total weight of the composite, even at least 0.1 wt %. The amount of the solid particulate material generally does not exceed 50 wt %, more typically it does not exceed 45 wt %. Vinylidene chloride polymer composites comprising from 1 wt % to 40 wt %, and even from 1 wt % to 30 wt % of the solid particulate material have been found to be suitable for most applications.

A further object of the present invention is a composition comprising the vinylidene chloride polymer composite as defined above.

In one aspect the composition may be a solid composition, typically comprising the vinylidene chloride polymer composite and at least one polymer. The polymer used in the composition will be typically, but not limiting, selected among those polymers which are compatible with vinylidene chloride polymers. For instance, the other polymer may be a vinylidene chloride polymer, whose composition may be the same or different from the composition of the vinylidene chloride polymer in the vinylidene chloride polymer composite.

In another aspect the composition may be a liquid composition comprising the vinylidene chloride polymer composite and a liquid phase.

The liquid phase may be the same or different from the liquid phase used in the process for preparing the vinylidene chloride polymer composite. In a particularly advantageous aspect of the process of the invention, when the liquid phase does not consist essentially of vinylidene chloride and any optional ethylenically unsaturated monomer, the process may be conveniently used to directly prepare a dispersion of the vinylidene chloride polymer composite in a liquid which is ready for use. Alternatively, the liquid composition may be prepared by dispersing or suspending the vinylidene chloride polymer composite in a liquid.

The process of the invention makes it possible to obtain vinylidene chloride polymer composites which may give rise to the formation of high-quality films, having improved barrier properties, in particular oxygen permeability and water vapour permeability, and/or improved UV stability, thermal stability, β-radiation stability.

Accordingly further objects of the present invention are the use of the vinylidene chloride polymer composites of the invention for the preparation of films, as well as the films comprising a vinylidene chloride polymer composite as above defined.

In one embodiment the films may be prepared by extrusion of a solid polymer composition comprising the vinylidene chloride polymer composite. Alternatively, the films may be prepared by conventional coating techniques either from a molten composition comprising the vinylidene chloride polymer composite or from a dispersion (either in water or in an appropriate solvent) of the vinylidene chloride polymer composite.

The invention will be now described in more detail with reference to the following examples, whose purpose is merely illustrative and not intended to limit the scope of the invention. Should the disclosure of any patents, patent applications, and publications which are incorporated herein by reference conflict with the description of the present application to the extent that it may render a term unclear, the present description shall take precedence.

EXAMPLES

Materials

Acrylic acid (AA, Aldrich, 99%) was purified through inhibitor removing columns. Butyl acrylate (BA, Aldrich, 99%), vinylidene chloride (VDC, Aldrich, 99%) and methyl acrylate (MA, Aldrich, 99%) were distilled under reduced pressure to remove inhibitors. 2-acrylamido-2-methylpropane sulfonic acid (AMPS, Aldrich 99%) and styrene (Aldrich >99%) were used as received.

2, 2'-Azobis(2-methylpropionitrile) (AIBN, Aldrich, 98%) was purified by recrystallization in methanol.

2,2'-Azobis[N-(2-carboxyethyl)-2-methylpropionamidine]hydrate (VA-057, Wako), tetrasodium pyrophosphate (TSPP, Alfa Aesar, 98%), sodium dodecylbenzenesulfonate (SDBS, Aldrich, technical grade), alkyldiphenyloxide disulfonate (DOWFAX™ 2A1, The Dow Chemical Company), trimethylsilyl bromide (TMSBr, Aldrich >97%), potassium persulfate (KPS, Aldrich 98%), Na$_2$S$_2$O$_5$ (Aldrich 97%), and α,α,α-trifluorotoluene (Sigma-Aldrich, 99%) were used as received.

Dibenzyl trithiocarbonate (DBTTC) was prepared according to ALI, et al. *Langmuir* 2009, vol. 25, no. 18, p. 10523.

Vinylbenzyl phosphonyl diethyl ester, the precursor to vinylbenzyl phosphonic diacid, was prepared by a two-step reaction of chloromethylstyrene and diethylphosphite at low temperature following the procedure described in RIBAUT, T., et al., *J. Polym. Sci., Part A: Polym. Chem.* 2009, vol. 47, p. 5448.

Water was deionized through an ion-exchange resin (conductivity below 1 mS/cm).

A commercial cerium oxide aqueous dispersion (Nanobyk-3810, 18 wt % cerium oxide, Byk Chemie) was dialyzed 4 times against deionized water employing Spectra/por 6 dialysis membranes (Spectrum Laboratories, MWCO 1000): the solid content of the dispersion after dialysis was 11.3 wt %.

Characterization

Molecular weights of poly(VDC-co-MA) copolymers were determined by Gel Permeation Chromatography in THF (flow rate 1 mL·min$^{-1}$) at 35° C. with a PL-GPC 50 plus (Varian) equipped with two columns of 300 mm (mixed-C PL-gel 5 μm, Polymer Laboratories) and a refractive index detector. Freeze-dried samples of CeO$_2$/poly (VDC-co-MA) hybrid latexes were dissolved in THF and filtered on 0.2 mm PTFE filters, before being auto-injected in the SEC apparatus. A calibration with polystyrene standards (K=14.1×10$^{-5}$ dL/g and a=0.7, according to S. Mori et al., "*Size Exclusion Chromatography*": Springer Verlag, 1999) was employed in combination with Mark-Houwink coefficients determined for poly(VDC-co-MA) copolymers with a 80:20 VDC:MA mass ratio (K=35×10$^{-5}$ dL/g and a=0.57, according to A. Revillon et al., *J. Polym. Sci., Part A: Polym. Chem.* 1976, 14, 2263) to calculate the polymer molecular weights.

Latex particle size distributions (pdi) and particle volume mean diameters (Dp) were determined by dynamic light scattering (DLS) with a Vasco 3 particle size analyzer (Cordouan technologies).

Zeta-potential measurements performed on a Malvern Nano ZS particle size analyzer were employed to analyze the adsorption of macro-RAFT agents at the surface of cerium oxide at pH 7. Given volumes of dialyzed cerium oxide aqueous dispersion and poly(BA$_m$-co-AA$_n$)-DBTTC RAFT agent aqueous stock solutions were mixed and diluted in deionized water and stirred overnight so as to obtain samples containing 4 g/L cerium oxide and macro-RAFT agent concentrations varying from 0.4 to 4 g/L. For each sample the Zeta-potential was calculated by taking an average of three measurements.

The preparation of samples for cryo-TEM observations involved a vitrification procedure on a FEI Vitrobot Mark III. A 3 μL sample (about 5 wt % solid content) was applied to a Quantifoil grid (R 2/2, Quantifoil Micro Tools GmbH; glow discharged for 40 s just prior to use) within the environmental chamber of the Vitrobot and the excess liquid was blotted away. The sample was immediately shot into melting ethane, immediately transferred to a cryoholder (Gatan 626) and observed under low dose conditions at −170° C. Pictures were obtained using a FEI Tecnai 20, Sphera TEM microscope (LaB$_6$ filament, operating voltage of 200 kV).

Example 1

Preparation of a Composite Comprising a Vinylidene Chloride/Methyl Acrylate Copolymer and Cerium Oxide Particles Using Poly[(Butyl Acrylate)$_p$-Co-(Acrylic Acid)$_q$]-RAFT Agent Part (a): Preparation of a Poly[(Butyl Acrylate)$_p$-Co-(Acrylic Acid)$_q$]-RAFT Agent with 2≤p≤20 and 2≤q≤20 Using Dibenzyl Trithiocarbonate (Formula (II) Wherein Z=—SCH$_2$(C$_6$H$_5$) and Ra=—CH$_2$(C$_6$H$_5$)).

In a typical recipe for the preparation of poly(BA$_p$-co-AA$_q$)-DBTTC RAFT a solution of acrylic acid, butyl acrylate, azobisisobutyronitrile and DBTTC in 1,4-dioxane was prepared in a 100 ml round bottom flask. This was stirred magnetically and purged with nitrogen for 30 minutes. The flask was then heated at 70° C. for 5 h (96% conversion of BA, 96% conversion of AA).

The poly(BA$_p$-co-AA$_q$)-DBTTC RAFT agent was isolated in dry form by drying the resulting solution overnight in a vacuum oven at 50° C.

Table 1 reports experimental data for the syntheses of poly(BA$_p$-co-AA$_q$)-DBTTC RAFT agents.

TABLE 1

| poly(BA$_p$-co-AA$_q$)-RAFT agent | Butyl acrylate (g) | Acrylic acid (g) | DBTTC (g) | AIBN (g) | 1,4-dioxane (g) |
|---|---|---|---|---|---|
| poly(BA$_5$-co-AA$_{10}$) | 9.76 | 11.30 | 4.40 | 0.224 | 25.22 |
| poly(BA$_{2.5}$-co-AA$_{10}$) | 6.00 | 13.61 | 5.52 | 0.281 | 27.80 |
| poly(BA$_{7.5}$-co-AA$_{10}$) | 12.10 | 9.12 | 3.65 | 0.196 | 25.29 |
| poly(BA$_5$-co-AA$_5$) | 10.60 | 6.03 | 4.80 | 0.238 | 24.95 |
| poly(BA$_{15}$-co-AA$_{20}$) | 13.24 | 9.95 | 1.99 | 0.103 | 25.51 |
| poly(BA$_{10}$-co-AA$_{20}$) | 10.61 | 11.90 | 2.41 | 0.132 | 25.37 |

Experimental molecular weights determined by H$^1$ NMR spectroscopy were in agreement with the targeted values. Polydispersity for all RAFT agents was in the range 1.21-1.33.

Part (b): Adsorption of Poly(BAp-Co-AAq)-DBTTC RAFT Agent at the Surface of Dispersed CeO$_2$.

The poly(BA$_p$-co-AA$_q$)-DBTTC RAFT agents prepared in part (a) were dissolved in deionized water by adjusting the pH with sodium hydroxide and added to the dialyzed cerium oxide dispersion. The solution was stirred overnight.

The successful adsorption of the macro-RAFT agents at the particles surface was evidenced by the evolution of the Zeta-potential towards more negative values upon addition of poly(BA$_p$-co-AA$_q$) copolymers. The addition of poly (BA$_5$-co-AA$_5$))-DBTTC RAFT agent resulted in the highest increase of the Zeta-potential absolute value.

Part (c): Emulsion Copolymerization of Vinylidene Chloride and Methyl Acrylate in the Presence of a Thermal Free Radical Initiator Emulsion copolymerization of vinylidene chloride and methyl acrylate (in a 9:1 mass ratio) was carried out in presence of poly(BA$_5$-co-AA$_5$)-DBTTC adsorbed at the surface of cerium oxide particles obtained in part (b).

The initial load prepared in part (b) containing the cerium oxide and poly(BA$_5$-co-AA$_5$)-DBTTC RAFT agent diluted in deionized water, a pre-emulsion of monomers (VDC and MA), water, tetrasodium pyrophosphate (TSPP), sodium dodecyl benzene sulfonate (SDBS) and an initiator aqueous solution (VA-057) were purged separately with argon during 30 min.

The reaction was performed in a 300 mL stainless steel reactor (Parr Instrument Company), equipped with a stainless steel 4-blabed mechanical stirrer and internal pressure and temperature sensors. Oxygen was removed from the reactor by purging it via three cycles of vacuum ($10^{-2}$ mbar) broken with nitrogen. Vacuum was restored in the reactor before charging the initial load. A 3 bars argon overpressure was established in the vessel. The agitation speed was set at 250 rpm and the temperature was raised to 60° C. Via a Series III digital HPLC pump (LabAlliance): quickly a 10 mL of initiator solution (20 g/L) at a rate of 4 mL/min was pumped into the reactor then a stirred pre-emulsion containing TSPP, water, SDBS, VDC and MA were continuously pumped into the reactor at a rate of 10.8 mL/h for 5 h. The overall reaction lasted for 6 h. Residual monomer was stripped by heating up the latex for 1 h at 60° C. under reduced pressure.

Table 2 reports the experimental data for the emulsion polymerization of vinylidene chloride/methyl acrylate in the presence of $CeO_2$ under the control of poly($BA_5$-co-$AA_5$)-DBTTC in the presence of a thermal free radical initiator (VA-057).

TABLE 2

|  | Reactants | Run 1 Mass (g) | Run 2 Mass (g) |
|---|---|---|---|
| Initial load | Dispersion $CeO_2$ | 14.222 | 14.202 |
|  | poly($BA_5$-co-$AA_5$)-DBTTC | 0.781 | 0.781 |
|  | Water | 85.09 | 85.07 |
|  | NaOH | 0.14 | 0.14 |
| Initiator | VA-057 | 0.200 | 0.201 |
|  | Water | 9.80 | 9.80 |
| Monomers pre-emulsion | Vinylidene chloride | 32.61 | 32.67 |
|  | Methyl acrylate | 3.67 | 3.67 |
|  | SDBS | 0.0137 | 1.7356 |
|  | TSPP | 0.1457 | 0.1433 |
|  | Water | 20.02 | 20.01 |

The results of the polymerization runs are reported in Table 3.

TABLE 3

|  | Solid Content$_{exp}$ (%) | Conversion (%) | Mn (g/mol) | Particle size (nm) | pdi |
|---|---|---|---|---|---|
| Run 1 | 20.3 | 85.9 | 89500 | 187 | 0.16 |
| Run 2 | 23.2 | 95.4 | 74700 | 108 | 0.2 |

TEM pictures of the latexes obtained in Runs 1 and 2 show the $CeO_2$ particles encapsulated in the polymeric matrix.

Part (d): Emulsion Copolymerization of Vinylidene Chloride and Methyl Acrylate in the Presence of a Redox Free Radical Initiator Emulsion copolymerization of vinylidene chloride and methyl acrylate (in a 9:1 mass ratio) was carried out in presence of poly($BA_5$-co-$AA_5$)-DBTTC adsorbed at the surface of cerium oxide particles obtained according to the procedure disclosed in part (b) according to the procedure described in part (c) but using a redox initiator (KPS/$Na_2S_2O_5$) at 55° C. The experimental data are reported in Table 4.

TABLE 4

|  | Reactants | Run 3 Mass (g) | Run 4 Mass (g) |
|---|---|---|---|
| Initial load | Dispersion $CeO_2$* | 21.53 | 21.50 |
|  | poly($BA_5$-co-$AA_5$)-DBTTC | 1.94 | 1.94 |
|  | Water | 31.83 | 30.29 |
| Initiator | $Na_2S_2O_5$ | 0.20 | — |
|  | KPS | — | 0.71 |
| Monomers pre-emulsion | Vinylidene chloride | 86.92 | 87.14 |
|  | Methyl acrylate | 10.38 | 9.65 |
|  | Dowfax 2A1 | 3.78 | 3.81 |
|  | TSPP | 0.35 | 0.35 |
|  | $Na_2S_2O_5$ | — | 0.40 |
|  | KPS | 0.35 | — |
|  | Water | 50.98 | 51.00 |

*Not dialyzed.

The results of the polymerization runs are reported in Table 5.

TABLE 5

|  | Solid Content$_{exp}$ (%) | Mn (g/mol) | Average Particle size (nm) | pdi |
|---|---|---|---|---|
| Run 3 | 38 | 92000 | 107 | 0.12 |
| Run 4 | 41 | 75000 | 107 | 0.16 |

In Runs 3 and 4, latexes of high solid content incorporating $CeO_2$ particles in the polymeric matrix were obtained using a redox initiating system.

Example 2

Preparation of a Composite Comprising a Vinylidene Chloride/Methyl Acrylate Copolymer and Cerium Oxide Particles Using Poly[(Butyl Acrylate)$_p$-Co-(Acrylic Acid)$_q$-Co-AMPSr]-RAFT Agent.

Part (a): Preparation of a Poly[(Butyl Acrylate)$_{p'}$-Co-(Acrylic Acid)$_{q'}$-Co-AMPSr]-RAFT Agent with $2 \leq p' \leq 10$, $2 \leq q' \leq 15$ and $1 \leq r \leq 8$ Using Dibenzyl Trithiocarbonate (Formula (II) Wherein Z=—$SCH_2(C_6H_5)$ and Ra=—$CH_2$($C_6H_5$)).

Poly($BA_{p'}$-co-$AA_{q'}$-co-$AMPS_r$)-DBTTC random copolymers with different compositions were synthesized by copolymerization of butyl acrylate, acrylic acid and 2-acrylamido-2-methylpropane sulfonic acid (AMPS) in dimethylsulfoxide at 70° C., employing AIBN as initiator and DBTTC as RAFT agent. A DBTTC:AIBN molar ratio of 3.3 was employed. At the end of the reaction the poly($BA_{p'}$-co-$AA_{q'}$-co-$AMPS_r$)-DBTTC RAFT agent was isolated in dry form.

Table 6 reports experimental data for the syntheses of poly($BA_{p'}$-co-$AA_{q'}$-co-$AMPS_r$)-DBTTC RAFT agents.

TABLE 6

| poly($BA_{p'}$-co-$AA_{q'}$-co-$AMPS_r$)-DBTTC RAFT agent | Butyl acrylate (g) | Acrylic acid (g) | AMPS (g) | DBTTC (g) | AIBN (g) | DMSO (g) |
|---|---|---|---|---|---|---|
| poly($BA_{7.5}$-co-$AA_{10}$-co-$AMPS_4$) | 2.68 | 2.00 | 2.30 | 0.81 | 0.14 | 34.00 |
| poly($BA_5$-co-$AA_5$-co-$AMPS_4$) | 2.16 | 1.19 | 2.76 | 0.97 | 0.16 | 34.00 |

Part (b): Emulsion Copolymerization of Vinylidene Chloride and Methyl Acrylate in the Presence of a Thermal Free Radical Initiator Emulsion copolymerization of vinylidene chloride and methyl acrylate (in a 9:1 mass ratio) was carried out, following the same procedure described in Example 1-parts (b) and (c), in the presence of poly($BA_p$-co-$AA_q$-$AMPS_r$)-DBTTC RAFT adsorbed on the surface of cerium oxide using a thermal free radical initiator (VA-057). Table 7 reports the experimental data for the emulsion polymerization

TABLE 7

|  | Reactants | Run 5 Mass (g) | Run 6 Mass (g) |
|---|---|---|---|
| Initial load | Dispersion $CeO_2$ | 14.21 | 14.20 |
|  | poly($BA_{7.5}$-co-$AA_{10}$-co-$AMPS_4$) | 1.06 | — |
|  | poly($BA_5$-co-$AA_5$-co-$AMPS_4$) | — | 1.20 |
|  | Water | 88.39 | 87.97 |
| Initiator | VA-057 | 0.138 | 0.206 |
| Monomers pre-emulsion | Vinylidene chloride | 38.52 | 37.98 |
|  | Methyl acrylate | 4.31 | 4.23 |
|  | SDBS | 0.017 | 0.019 |
|  | TSPP | 0.17 | 0.15 |
|  | Water | 23.19 | 23.12 |

The results of the polymerization runs are reported in Table 8.

TABLE 8

|  | Solid Content$_{exp}$ (%) | Conversion (%) | Average Particle size (nm) | pdi |
|---|---|---|---|---|
| Run 5 | 22.4 | 82.6 | 79 | 0.23 |
| Run 6 | 25.6 | 95.6 | 129 | 0.19 |

The latexes obtained in Runs 5 and 6 confirmed the incorporation of $Ceo_2$ particles in the polymeric matrix.

Example 3

Preparation of a Composite Comprising a Vinylidene Chloride/Methyl Acrylate Copolymer and Cerium Oxide Particles Using Poly[(Vinylbenzyl Phosphonic Diacid)$_s$-Co-(Styrene)$_t$]-RAFT Agent.

Part (a): Preparation of a Poly[(Vinylbenzyl Phosphonic Diacid)$_s$-Co-(Styrene)$_t$]-RAFT Agent with 2≤s≤10 and 1≤t≤8 Using Dibenzyl Trithiocarbonate (Formula (II) Wherein Z=—$SCH_2(C_6H_5)$ and Ra=—$CH_2(C_6H_5)$).

Poly[(vinylbenzyl phosphonyl diethyl ester)$_s$-co-(styrene)$_t$]-DBTTC random copolymers with different compositions were synthesized by copolymerization of vinylbenzyl phosphonyl diethyl ester (VBPDE), the precursor to vinylbenzyl phosphonic diacid, and styrene (Sty) in α,α,α-trifluorotoluene (TFT) at 75° C., employing AIBN as initiator and DBTTC as RAFT agent. At the end of the reaction the poly(VBPDE$_s$-co-Sty$_t$)-DBTTC RAFT agent was isolated in dry form.

Table 9 reports experimental data for the syntheses of poly(VBPDE$_s$-co-Sty$_t$)-DBTTC RAFT agents.

TABLE 9

| poly(VBPDE$_s$-co-Sty$_t$)-DBTTC RAFT agent | VBPDE (g) | Styrene (g) | DBTTC (g) | AIBN (g) | TFT (mL) |
|---|---|---|---|---|---|
| poly(VBPDE$_5$-co-Sty$_5$) | 3.00 | 1.24 | 0.69 | 0.12 | 3.7 |
| poly(VBPDE$_{10}$-co-Sty$_5$) | 3.01 | 0.65 | 0.34 | 0.06 | 3.1 |
| poly(VBPDE$_{10}$-co-Sty$_{2.5}$) | 3.02 | 0.34 | 0.34 | 0.06 | 2.9 |

The poly(VBPDE$_s$-co-Sty$_t$)-DBTTC RAFT agents were first reacted with trimethylsilyl bromide (molar ratio TMSBr/VPBDE of 2.8) under an inert atmosphere and then cleaved in methanol and precipitated in the presence of HCl to provide the corresponding RAFT agents with the phosphonic di-acid groups (VBPDA).

Part (b): Emulsion Copolymerization of Vinylidene Chloride and Methyl Acrylate in the Presence of a Thermal Free Radical Initiator Emulsion copolymerization of vinylidene chloride and methyl acrylate (in a 9:1 mass ratio) was carried out, following the same procedure described in Example 1-parts (b) and (c), in the presence of poly(VBPDA$_{10}$-co-Sty$_{2.5}$)-DBTTC RAFT adsorbed on the surface of cerium oxide using a thermal free radical initiator (VA-057). Table 10 reports the experimental data for the emulsion polymerization

TABLE 10

|  | Reactants | Run 7 Mass (g) |
|---|---|---|
| Initial load | Dispersion $CeO_2$ | 14.19 |
|  | poly(VBPDA$_{10}$-co-Sty$_{2.5}$) | 0.78 |
|  | Water | 86.9 |
| Initiator | VA-057 | 0.106 |
| Monomers pre-emulsion | Vinylidene chloride | 35.10 |
|  | Methyl acrylate | 3.90 |
|  | SDBS | 0.016 |
|  | TSPP | 0.15 |
|  | Water | 21.50 |

The results of the polymerization run are reported in Table 11.

TABLE 11

|  | Solid Content$_{exp}$ (%) | Conversion (%) | Mn (g/mol) | Average Particle size (nm) | pdi |
|---|---|---|---|---|---|
| Run 7 | 23.4 | 98 | 71500 | 143 | 0.03 |

The latex obtained in Run 7 confirmed the incorporation of $CeO_2$ particles in the polymeric matrix.

The invention claimed is:

1. A process for preparing a vinylidene chloride polymer composite, the process comprising:
providing a dispersion of a solid particulate material in a liquid phase, said dispersion comprising a RAFT/MADIX agent of formula (III):

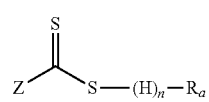

(III)

wherein $R_a$ is selected from $C_1$-$C_6$ alkyl, $C_1$-$C_6$ alkoxy, aryl and heteroaryl, each of which may be substituted with one or more hydrophilic groups selected from —$CO_2H$, —$CO_2R$, —CN, —$SO_3H$, —$OSO_3H$, —SOR, —$SO_2R$, —$OP(OH)_2$, —$P(OH)_2$, —PO$(OH)_2$, —OH, —OR, —$(OCH_2$—$CHR^O)_w$—OH, —$(OCH_2$—$CHR^O)_w$—OR, —$CONH_2$, $CONHR^1$, $CONR^1R^2$, —$NR^1R^2$, and —$NR^1R^2R^3$;

$R^1$, $R^2$ and $R^3$ are independently selected from $C_1$-$C_6$ alkyl and aryl which are optionally substituted with one or more hydrophilic substituents selected from —$CO_2H$, —$SO_3H$, —$OSO_3H$, —OH, —$(OCH_2CHR^O)_w$—OH, —$CONH_2$, —SOR, $SO_2R$, and salts thereof;

R is $C_1$-$C_6$ alkyl;

$R^O$ is selected from hydrogen and R;

w is an integer from 1 to 10;

Z is selected from optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O)(OR$^4$)$_2$], and dialkyl- or diaryl-phosphinyl [—P(=O)R$^4_2$];

$R^4$ is selected from the group consisting of optionally substituted $C_1$-$C_{18}$ alkyl, optionally substituted $C_2$-$C_{18}$ alkenyl, optionally substituted aryl, optionally substituted heterocyclyl, optionally substituted arylalkyl, optionally substituted alkylaryl, optionally substituted acylamino, optionally substituted acylimino, optionally substituted amino, and a polymer chain formed by any mechanism;

each H is independently a polymerised residue of an ethylenically unsaturated monomer; and n is an integer from 1 to 300;

providing vinylidene chloride and optionally at least one ethylenically unsaturated monomer copolymerisable therewith to said dispersion; and polymerising vinylidene chloride and optionally said at least one ethylenically unsaturated monomer under the control of said RAFT/MADIX agent to form vinylidene chloride polymer at the surface of said solid particulate material.

2. The process according to claim 1 wherein the solid particulate material comprises an inorganic material selected from the group consisting of cerium dioxide, titanium dioxide, silicon dioxide and combinations thereof.

3. The process according to claim 2 wherein the solid particulate is cerium dioxide.

4. The process according to claim 1 wherein the liquid phase is water.

5. The process according to claim 1 wherein —(H)$_n$— comprises recurring units derived from at least one ethylenically unsaturated monomer having hydrophilic character (h1) and at least one ethylenically unsaturated monomer having hydrophobic character (h2).

6. The process according to claim 5 wherein the at least one ethylenically unsaturated monomer having hydrophilic character (h1) contains functional groups having a corresponding acid with an acid dissociation constant pKa of less than 6.

7. The process according to claim 1 wherein $R_a$ is selected from the group consisting of: —$CH(CH_3)CO_2H$, —$CH(CO_2H)CH_2CO_2H$, —$C(CH_3)_2CO_2H$, —$CH_2(C_6H_5)$, —$C(CN)(CH_3)CO_2H$, and —$C(CN)(CH_3)(CH_2)_2CO_2H$;

Z is selected from the group consisting of: —$SCH_2(C_6H_5)$, —$S(CH_2)_uCO_2H$, —$SC_zH_{2z+1}$, —$OC_zH_{2z+1}$, —$SCH_2CH_2OH$, —$OCH_2CF_3$, and —$N(C_6H_5)(CH_3)$;

u is an integer from 2 to 11; and z is an integer from 1 to 12.

8. The process according to claim 1 wherein the RAFT/MADIX agent is an agent of formula (III):

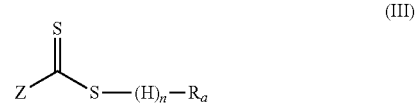

(III)

wherein $R_a$ is selected from the group consisting of: —$CH(CH_3)CO_2H$, —$CH(CO_2H)CH_2CO_2H$, —$C(CH_3)_2CO_2H$, —$CH_2(C_6H_5)$, —$C(CN)(CH_3)CO_2H$, and —$C(CN)(CH_3)(CH_2)_2CO_2H$;

Z is selected from the group consisting of: —$SCH_2(C_6H_5)$, —$S(CH_2)_uCO_2H$, —$SC_zH_{2z+1}$, —$OC_zH_{2z+1}$, —$SCH_2CH_2OH$, —$OCH_2CF_3$, and —$N(C_6H_5)(CH_3)$;

u is an integer from 2 to 11;

z is an integer from 2 to 12;

each H is independently a polymerised residue of an ethylenically unsaturated monomer;

n is an integer from 1 to 300; and

—(H)$_n$— comprises recurring units derived from at least one ethylenically unsaturated monomer having hydrophilic character and containing functional groups having a corresponding acid with an acid dissociation constant pKa of less than 6 (h1) and at least one ethylenically unsaturated monomer having hydrophobic character (h2).

9. The process according to claim 1 wherein the solid particulate material comprises an inorganic material.

10. The process according to claim 1 wherein n is an integer from 1 to 200.